M. A. MENKE.
FILTER.
APPLICATION FILED MAR. 29, 1920.

1,434,905.

Patented Nov. 7, 1922.

WITNESSES
H. C. Hebig
S. W. Foster

INVENTOR
M. A. Menke,
BY
ATTORNEYS

Patented Nov. 7, 1922.

1,434,905

UNITED STATES PATENT OFFICE.

MEINARD ALOYSIUS MENKE, OF HAGERSTOWN, MARYLAND.

FILTER.

Application filed March 29, 1920. Serial No. 369,523.

*To all whom it may concern:*

Be it known that I, MEINARD ALOYSIUS MENKE, a citizen of the United States, and a resident of Hagerstown, in the county of Washington and State of Maryland, have invented a new and Improved Filter, of which the following is a full, clear, and exact description.

This invention relates to the improvements in filters, and more particularly to filters of the funnel type employing filtering paper therein, an object of the invention being to provide improved means for holding the filtering paper away from the surface of the funnel so as to enlarge or extend the filtering area of the paper and prevent sticking of the paper to the walls of the funnel.

Heretofore, when filtering paper has been positioned in a funnel, the wet paper has adhered or stuck to the sides or walls of the funnel and only the lower portion of the paper has had any filtering operation or function, and it is the purpose of my invention to maintain the filtering paper away from the surface of the funnel so that the paper can have a filtering surface or wall throughout its entire length in the funnel.

With these and other objects in view the invention consists in certain novel features of construction, and combinations and arrangements of parts as will be more fully hereinafter described and pointed out in the claims.

In the accompanying drawings—

Figure 1:
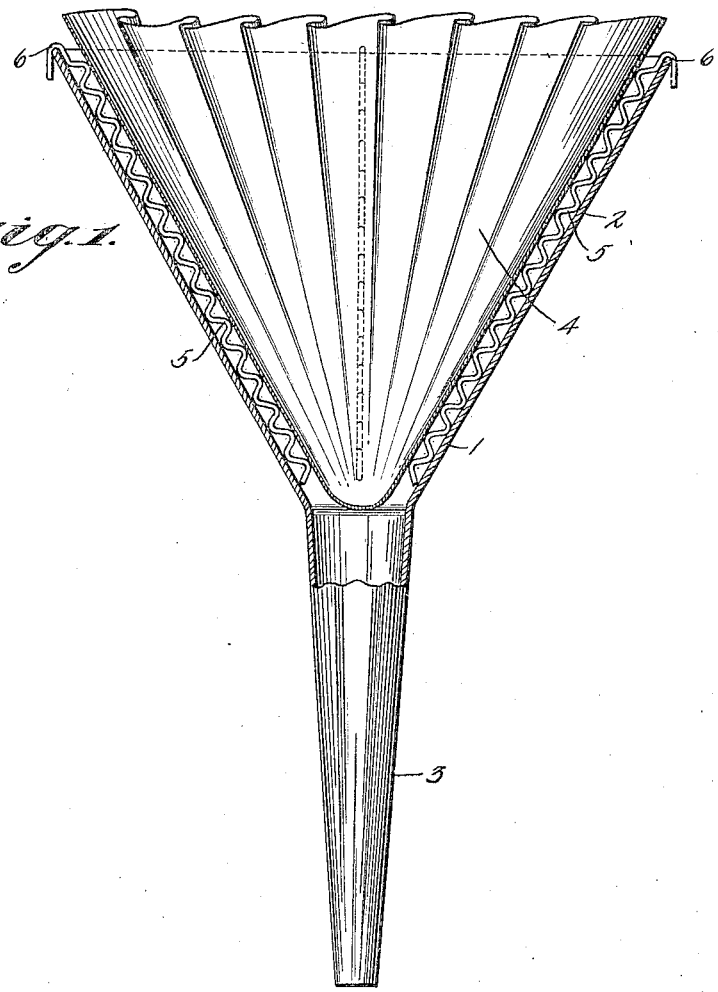
Figure 1 is a view mainly in longitudinal section illustrating my invention.
Figure 2:
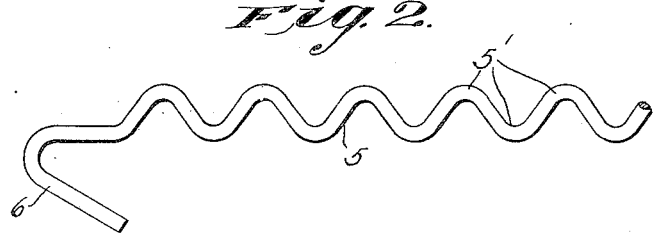
Figure 2 is an enlarged fragmentary view of one of the spacing devices.

1 represents a funnel having a conical or tapering upper end 2 and a lower restricted end 3 as is common in the art. 4 represents a paper filter which is located in the upper portion 2 of the funnel 1, and 5, 5 are my improved spacing devices which are located in the funnel and between the paper filter 4 and the walls of the funnel. These spacing devices 5 are made of wire or other suitable material longitudinally corrugated, as shown at 5', and provided at their upper ends with hooks 6 to engage over the upper edge of the funnel and hold the spacing devices against longitudinal movement.

It is obvious that these spacing devices may be variously shaped and may be made of various materials without departing from my invention.

The purpose of the spacing devices is to maintain the filtering paper away from the surface of the funnel so that the entire wall of the paper filter can be utilized for filtering purposes allowing the liquid to pass through the same both at the sides of the filtering paper as well as at the lower end thereof.

It is obvious that I might resort to various other forms of spacing means to maintain the paper away from the funnel and hence I do not limit myself to the precise construction set forth, but consider myself at liberty to make such changes and alterations as fairly fall within the spirit and scope of the appended claims.

I claim:

1. The combination with a funnel and filtering paper in the funnel, of a plurality of members suspended from the upper edge of the funnel, and spacing the filtering paper from the inner wall of the funnel.

2. The combination with a funnel and filtering paper in the funnel, of longitudinally corrugated wire members suspended from the upper edge of the funnel, and spacing the filtering paper from the inner walls of the funnel.

3. The combination with a funnel, and filtering paper in the funnel, of spacing devices located between the filtering paper and the funnel and holding the filtering paper away from the surface or wall of the funnel, said spacing devices comprising longitudinally corrugated members, and hooks on the upper ends of said members engaging over the upper edge of the funnel.

MEINARD ALOYSIUS MENKE.